United States Patent [19]

Funayama et al.

[11] Patent Number: 4,933,160

[45] Date of Patent: Jun. 12, 1990

[54] REFORMED, INORGANIC POLYSILAZANE

[75] Inventors: Osamu Funayama; Mikiro Arai, both of Saitama; Takeshi Isoda, Niiza, all of Japan

[73] Assignees: Petroleum Energy Center; Toa Nenryo Kogyo Kabushiki Kaisha, both of Japan

[21] Appl. No.: 323,375

[22] Filed: Mar. 14, 1989

Related U.S. Application Data

[62] Division of Ser. No. 230,421, Aug. 10, 1988, Pat. No. 4,861,569.

[51] Int. Cl.$^5$ .................. C01B 33/00; C01B 21/063; C01B 33/06
[52] U.S. Cl. ..................................... 423/324; 423/344
[58] Field of Search ............................... 423/324, 344

[56] References Cited

U.S. PATENT DOCUMENTS 4,482,669 11/1984 Seyferth et al. .................. 524/442
4,840,778 6/1989 Arai et al. .......................... 423/324

*Primary Examiner*—John Doll
*Assistant Examiner*—Lori F. Cuomo
*Attorney, Agent, or Firm*—Lorusso & Loud

[57] ABSTRACT

A novel, reformed, inorganic polysilazane which is liquid or solid at room temperature and soluble in o-xylene at room temperature and which has (a) a number-average molecular weight of 200-500,000, (b) contents of Si, N and H of 50-70% by weight, 20-34% by weight and 5-9% by weight, respectively; and (c) —SiH$_2$— and —SiH$_3$ groups, the molar ratio of the —SiH$_2$— groups to the —SiH$_3$ groups being 2.0:1 to 8.4:1. The reformed polysilazane is obtained by reaction of a solution of a polysilazane in an organic base-containing solvent to polycondense the polysilazane.

6 Claims, No Drawings

REFORMED, INORGANIC POLYSILAZANE

This is a division of application Ser. No. 230,421 filed Aug. 10, 1988, now U.S. Pat. No. 4,861,569.

This invention relates to a novel, reformed, inorganic polysilazane and to a method of preparing same.

There are known inorganic polysilazanes which are proposed to be used as a precursor material for the production of silicon nitride-containing ceramics. Known inorganic polysilazanes are liquid or solid and the solid polysilazanes are insoluble in an organic solvent such as o-xylene. For example, A. Stock discloses an inorganic polysilazane of the formula $+SiH_2NH+_n$ prepared by reacting dichlorosilane with ammonia using benzene as a solvent (Ber. 54, 740 (1921)). This inorganic polysilazane is an oligomer (n = 7 to 8) and is a viscous liquid at room temperature. D. Seyferth et al suggest an inorganic polysilazane obtained by reacting dichlorosilane with ammonia using dichloromethane as a solvent (US-A-4,397,828). This polysilazane is an oily liquid having a proton ratio Si-H/N-H of about 3.3 and becomes solidified when heated at about 200° C. or when allowed to stand for 3-5 days. The solidified polysilazane is insoluble in an organic solvent such as o-xylene. Japanese Published Unexamined Patent Application (Tokkyo Kokai) No. 60-145,903 discloses an inorganic polysilazane obtained by reacting a dihalosilane adduct such as a dichlorosilane-pyridine adduct with ammonia. The resultant polysilazane upon removal of the solvent therefrom is a viscous liquid or a resinous solid. This solid, however, is insoluble in an organic solvent such as o-xylene.

In utilizing an inorganic polysilazane as raw materials for ceramic fibers, binders, coating agents or the like, it is highly desirable that the polysilazane be soluble in an organic solvent and have a high molecular weight. In this respect, the above-described known inorganic polysilazanes are not fully satisfactory.

The present invention has been made with the foregoing problems of the conventional inorganic polysilazane in view and provides a reformed, inorganic polysilazane which is liquid or solid at room tempeature and soluble in o-xylene at room temperature and which has (a) a number-average molecular weight of 200–500,000, (b) contents of Si, N and H of 50–70 % by weight, 20–34 % by weight and 5–9 % by weight, respectively; and (c) —SiH$_2$— and —SiH$_3$ groups, the molar ratio of the —SiH$_2$— groups to the —SiH$_3$ groups being 2.0:1 to 8.4:1.

In another aspect, the present invention provides a method of reforming an inorganic polysilazane, comprising reacting a solution of the polysilazane in an organic base-containing solvent at a temperature and for a period of time sufficient to polycondense the polysilazane.

The present invention will now be described in detail below.

The raw material, inorganic polysilazane to be used in the method according to the present invention has as its main skeletal structure represented by the following recurring unit:

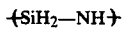

and has a number average molecular weight of 100–50,000, preferably 300–2,000, more preferably 600–1,400. The polysilazane may have a cyclic or linear form. Polysilazanes having both cyclic and linear portions may also be suitably used. Inorganic polysilazanes disclosed in the above-described references are suitably used for the purpose of the present invention.

The raw material inorganic polysilazane is dissolved in an organic base-containing solvent and the solution is subjected to dehydrogenative polycondensation conditions. The organic base-containing solvent may be either a liquid organic base or a non-basic organic solvent having dissolved therein an organic base.

Any liquid organic base which does not react with the raw material inorganic polysilazane may be used as the organic base-containing solvent. Illustrative of suitable liquid organic bases are tertiary amines such as trimethylamine, dimethylamine, dimethylethylamine, diethylmethylamine, triethylamine, pyridine and a substituted pyridine, dimethylaniline and a substituted dimethylaniline, pyrazine and a substituted pyrazine, pyrimidine and a subsituted pyrimidine, pyridazine and a substituted pyridazine, pyrrole, 3-pyrroline, pyrazole, 2-pyrazoline and mixtures thereof.

The organic base to be dissolved in the non-basic orgaic solvent may be tertiary amines such as described immediately above, secondary amines having bulky groups and phosphines. The non-basic organic solvent may be, for example, aliphatic hydrocarbons, alicyclic hydrocarbons, aromatic hydrocarbons, halogenated hydrocarbons, aliphatic ethers and alicyclic ethers. Illustrative of suitable non-basic organic solvents are methylene chloride, chloroform, carbon tetrachloride, bromoform, ethylene chloride, ethylidene chloride, trichloroethane, tetrachloroethane, ethyl ether, isopropyl ether, ethyl butyl ether, butyl ether, 1,2-dioxyethane, dioxane, dimethyl dioxane, tetrahydrofuran, tetrahydropyrane, pentane, hexane, isohexane, methylpentane, heptane, isoheptane, octane, isooctane, cyclopentane, methylcyclopentane, cyclohexane, methylcyclohexane, benzene, toluene, xylene, ethylbenzene and mixtures thereof.

The amount of the organic base is at least 5 parts by weight, preferably at least 20 % by weight per 100 parts by weight of the non-basic organic solvent.

The solution of the raw material inorganic polysilazane in the organic base-containing solvent generally has a concentration of 0.1–50 % by weight. Too high a concentration of the polysilazane in excess of 50 % by weight causes a difficulty in controlling the polycondensation. On the other hand, too low a concentration below 0.1 % by weight is undesirable because the polycondensation proceeds too slowly. The concentration of the raw material polysilazane is preferably 1–12 % by weight.

The polycondensation is performed at a temperature of generally −78 to 300° C., preferably 20–250° C., more preferably 100–200° C. A temperature below −78° C. is insufficient to effect the polycondensation while too high a temperature in excess of 300° C. causes difficulties in homogeneously proceeding the polycondensation. Preferably the polycondensation is carried out in an atmosphere of dry nitrogen, dry argon or the like inert atmosphere. When the reaction is performed in a closed reactor such as autoclave, the reaction pressure becomes increased as the reaction proceeds because of the in situ production of hydrogen gas. It is not necessary, however, to carry out the polycondensation in a pressurized condition. The reaction may be performed under ambient pressure. The reaction time varies with the kinds and concentrations of the raw material polysilazane and the organic base, the reaction temperature adopted and the intended properties of the reformed polysilazane product but generaly in the range of about 0.5-20 hours. The optimum reaction conditions vary with the average molecular weight and molecular weight distribution of the raw material polysilazane. More severe conditions are generally adopted as the molecular weight of the raw material polysilazane becomes low.

The reaction mixture after the completion of the polycondensation is generally a solution containing the reformed polysilazane and the organic base-containing solvent. It is desirable to reduce the concentration of the organic base in the reaction product, since otherwise a gellation of the reaction mixture will result when it is allowed to stand for a long time at room temperature. The reduction of the concentration of the organic base may be effected by removing at least a portion of the organic base by distillation and substituting therefor a suitable amount of a non-basic organic solvent such as a hydrocarbon, a halogenated hydrocarbon or an ether. The nonbasic organic solvents exemplified previously are suitably used. Such a replacement operation may be repeated twice or more, if desired, to obtain a stable solution of the reformed polysilazane. In particular, it is preferred that the concentration of the organic base in the reformed polysilazane solution be 30 % or less, more preferably 5 % or less based on the total weight of the organic base and the non-basic organic solvent contained in the solution.

The polycondensation involves the following reaction:

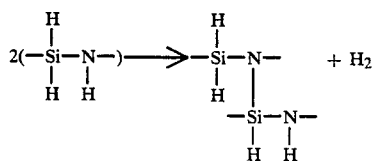

The polycondenation produces a lot of new cross-linkages between the raw material polysilazane molecules so that the molecular weight of the polycondensation product, i.e. reformed polysilazane, is increased. The reformed polysilazane has a molecular weight of 200-500,000, preferably 1000-50,000, more preferably 1,500-10,000.

The reformed product obtained by the polycondensation has a number of branched side chains, so that the amount of $SiH_3$ groups is much increased as compared with the raw material polysilazane. For this reason, even when the polycondensation results in the formation of a reformed polysilazane which becomes solidified upon removal of the solvent, this solid is soluble in an organic solvent such as o-xylene, notwithstanding its high molecular weight. The branched chains are considered to result from the following reaction:

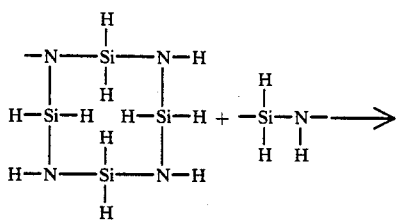

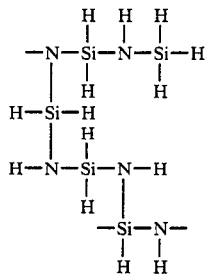

The formation of the branched chains may be confirmed by comparing proton NMR spectra of the reformed polysilazane and the raw material polysilazane. Namely, the integration ($S_{2H}$) of the peak at δ4.8 ppm (attributed to the $SiH_2$ group) and that ($S_{3H}$) of the peak at δ4.4 ppm (attributed to the $SiH_3$ group) gives a $SiH_2$/$SiH_3$ molar ratio ($=3S_{2H}/2S_{3H}$). While the $SiH_2$/$SiH_3$ molar ratio is 5.0-19.0 in the case of the raw material polYsilazane, the reformed product gives a reduced $SiH_2$/$SiH_3$ molar ratio of 2.0-8.4. This reduced range of the $SiH_2$/$SiH_3$ molar ratio is important in order for the reformed polysilazane to exhibit desirable solubility. The $SiH_2$/$SiH_3$ molar ratio is preferably 2.0-7.0, more preferably 2.0-5.0. When the $SiH_2$/$SiH_3$ molar ratio is below 2.0, the solubility of the reformed polysilazane in an organic solvent such as o-xylene tends to become poor.

The reformed polysilazane thus obtained has contents of Si, N and H of 59-70 %, 20-34 % and 5-9 % by weight, respectively, preferably 61-68 %, 25-33 % and 5-8 % by weight, respectively, and more preferably 64-68 %, 27-33 % and 5-7 % by weight, respectively.

As having been described in the foregoing, since the reformed, inorganic polysilazane of the present invention is soluble in various organic solvents and since it is able to be converted into silicon nitride or silicon nitride-containing ceramics upon calcination, it may be suitably used as raw materials for the production of shaped ceramic bodies such as continuous fibers, films and coatings which are excellent in various properties such as mechanical strengths at elevated temperatures, heat resistance, corrosion resistance, oxidation resistance and resistance to thermal shock. The high ceramic yield of the reformed polysilazane also permits the use thereof as binders and impregnating materials. Moreover, the reformed polysilazane, which is free of undesirable impurities such as metal catalysts, catalysts causing decomposition of the polysilazane, or the like impurities/ is stable and easy to handle, withstands a long term storage, and gives ceramics of a high purity with a high ceramic yield. Additionally, because of the high molecular weight and the increased crosslinkage of the reformed polysilazane, the solidifiability, moldability and the spinnability are improved. Further, the reformed polysilazane can be easily obtained by a simple method.

The following examples will further illustrate the present invention.

EXAMPLE 1

To a four-necked 500 ml flask equipped with a gas feed conduit, a mechanical stirrer and a Dewar condenser, an oxygen-free, dry nitrogen gas was fed to replace the inside of the flask therewith. After charging 280 ml of dry pyridine (deaerated), the flask was cooled in an ice bath. Then 51.6 g of dichlorosilane were added into the flask to form a white precipitate of adduct (SiH$_2$Cl$_2$·2C$_5$H$_5$N). Subsequently, with stirring and cooling in the ice bath, 30.0 g of ammonia which had been passed successively through a sodium hydroxide-containing tube and an active carbon-containing tube was bubbled through the reaction mixture within the flask. After completion of the reaction, the reaction mixture was centrifuged and the supernatant was washed with dry pyridine, followed by filtration to give 520 ml of a filtrate containing inorganic polysilazane. When the solvent was removed from the filtrate (5 ml) by evaporation in vacuo, 0.98 g of solid, inorganic polysilazane was obtained. Gel permeation chromatography of the polysilazane revealed that the polysilazane had a number-average molecular weight of 1020. The IR spectrum of the polysilazane (solvent: dry o-xylene, concentration: 9.8 g/liter) showed absorptions at 3350 cm$^{-1}$ and 1175 cm$^{-1}$ (based on NH), at 2170 cm$^{-1}$ ($\epsilon$=3.14, based on SiH) and at 1020-820 cm$^{-1}$ (based on SiH and SiNSi). The 60 MHz proton NMR spectrum (solvent:CDCl$_3$, reference: TMS) showed broad signals at $\delta$4.8 (SiH2) and $\delta$4.4 (SiH$_3$) and at $\delta$1.5 (NH). This polysilazane will be hereinafter referred to as polysilazane (I).

Polysilazane (I) was dissolved in pyridine to give 100 ml of a pyridine solution containing 5.24 % by weight of polysilazane (I). The solution was charged in an autoclave with a 300 ml inside volume and reacted at 150 ° C. under autogeneous pressure for 3 hours with stirring in the atmosphere of nitrogen. A large amount of a gas was found to be produced and the pressure within the autoclave was increased by 1.0 kg/cm$^2$ as a result of the reaction. After cooling to room temperature, dry ethylbenzene (200 ml) was mixed with the reaction mixture. The solvent was then removed by distillation at 50–70 ° C. under 3–5 mmHg to give 4.68 g of white powder. This powder (reformed product) was found to be soluble in toluene, tetrahydrofuran and chloroform. Gel permeation chromatography revealed that the reformed product had a number-average molecular weight of 2470. The IR spectrum of the reformed product (solvent: ethylbenzene) showed absorptions at 3350 cm$^{-1}$ and 1175 cm$^{-1}$ (based on NH), at 2170 cm$^{-1}$ (based on SiH) and at 1020-820 cm$^{-1}$ (based on SiH and SiNSi). The proton NMR spectrum (solvent: CDCl$_3$, reference: TMS) showed broad signals at $\delta$4.8 (SiH$_2$) at $\delta$4.4 (SiH$_3$) and at 1.5 (NH). The integrated ratio of (SiH$_2$)/(SiH$_3$) was 4.1.

EXAMPLE 2

Polysilazane (I) obtained in Example 1 was dissolved in pyridine to give 200 ml of a pyridine solution containing 6.18 % by weight of polysilazane (I). The solution was charged in an autoclave with a 300 ml inside volume and reacted at 120 ° C. under autogeneous pressure for 3 hours with stirring in the atmosphere of nitrogen. A large amount of a gas was found to be produced and the pressure within the autoclave was increased by 2.0 kg/cm$^2$ as a result of the reaction. The gas product was identified as being hydrogen by gas chromatographic analysis. After cooling to room temperature, dry ethylbenzene (400 ml) was mixed with the reaction mixture. The solvent was then removed by distillation at 50–70 ° C. under 3–5 mmHg to give 10.9 g of white powder soluble in toluene, tetrahydrofuran and chloroform. Gel permeation chromatography revealed that this powder (reformed polysilazane) had a number-average molecular weight of 1950. The elementary analysis of the reformed product gave (% by weight):

Si: 62.7, N: 25.7, 0: 3.52, C: 4.4, H:5.00

The proton NMR spectrum (solvent: CDC13, reference: TMS) showed broad signals at $\delta$4.8 (SiH$_2$) and $\delta$4.4 (SiH$_3$) and at $\delta$1.5 (NH).

EXAMPLE 3

The reformed polysilazane obtained in Example 2 was heated to 1400° C. in the atmosphere of nitrogen at a heat-up rate of 3° C./min and maintained at that temperature for 3 hours to obtain a calcined product which was yellowish brown ceramic powder. The yield was 79.6 % by weight. The powder X-ray diffraction analysis of this ceramic powder gave the following diffraction lines:

| 2θ (°) | Crystal face | Substance |
|---|---|---|
| 20.5 | (101) | α-Si$_3$N$_4$ |
| 22.9 | (110) | |
| 26.4 | (200) | |
| 30.9 | (201) | |
| 31.7 | (002) | |
| 34.5 | (102) | |
| 35.2 | (210) | |
| 38.8 | (211) | |
| 39.4 | (112) | |
| 40.1 | (300) | |
| 41.8 | (202) | |
| 43.4 | (301) | |
| 46.9 | (220) | |
| 48.2 | (212) | |
| 48.8 | (310) | |
| 23.3 | (110) | β-Si$_3$N$_4$ |
| 26.9 | (200) | |
| 33.6 | (101) | |
| 36.0 | (210) | |
| 41.4 | (201) | |
| 49.9 | (310) | |
| 28.4 | (111) | Si |
| 47.3 | (220) | |

From the X-ray diffraction pattern, the calcined product is identified as being crystalline silicon nitride. The elementary analysis of the calcined product gave (% by weight):

Si: 63.8, N: 28.7, 0: 2.17, C: 0.36, H: 0.11

EXAMPLE 4

Polysilazane (I) obtained in Example 1 was dissolved in α-picoline to give 120 ml of a pyridine solution containing 5.86 % by weight of polysilazane (I). The solution was charged in an autoclave with a 300 ml inside volume and reacted at 120 ° C. under autogeneous pressure for 3 hours with stirring in the atmosphere of nitrogen. A large amount of a gas was found to be produced. After cooling to room temperature, dry ethylbenzene was mixed with the reaction mixture. The solvent was then removed by distillation at 50–70 ° C. under 3–5 mmHg to give 6.22 g of white powder soluble in toluene, tetrahydrofuran and chloroform. Gel permeation chromatography revealed that this powder (reformed polysilazane) had a number-average molecular weight of 1850.

EXAMPLE 5

To a four-necked 500 ml flask equipped with a gas feed conduit, a mechanical stirrer and a Dewar condenser, an oxygen-free, dry nitrogen gas was fed to replace the inside of the flask therewith. After charging 260 ml of dry dichloromethane, the flask was cooled in an ice bath. Then 25.0 g of dichlorosilane were added into the flask. Subsequently, with stirring and cooling in the ice bath, 22.3 g of ammonia which had been passed successively through a sodium hydroxide-containing tube and an active carbon-containing tube was, as a mixture with dry nitrogen gas, bubbled through the reaction mixture within the flask. During the course of the reaction, it was necessary to occsionally beat the gas passage downstream of the flask in order to remove a powdery substance which deposited on and accumulated in the inside surface thereof and to prevent the clogging thereof. After completion of the reaction, the reaction mixture was centrifuged and the supernatant was washed with dry pyridine. After filtration, the solvent was removed from the filtrate by evaporation in vacuo to leave 4.9 g of viscous oily polysilazane. Gel permeation chromatography of the polysilazane revealed that the polysilazane had a number-average molecular weight of 620. This polysilazane will be hereinafter referred to as polysilazane (II).

Polysilazane (II) thus obtained was dissolved in pyridine to give 100 ml of a pyridine solution containing 7.25 % by weight of polysilazane (II). The solution was charged in an autoclave with a 300 ml inside volume and reacted at 120° C. under autogeneous pressure for 5 hours with stirring in the atmosphere of nitrogen. A. large amount of a gas was found to be produced. After cooling to room temperature, dry ethylbenzene was mixed with the reaction mixture. The solvent was then removed by distillation at 50–70° C. under 3–5 mmHg to give 6.43 g of white powder soluble in toluene, tetrahydrofuran and chloroform. Gel permeation chromatography revealed that this powder (reformed polysilazane) had a number-average molecular weight of 2030.

EXAMPLE 6

To a four-necked 500 ml flask equipped with a gas feed conduit, a mechanical stirrer and a Dewar condenser, an oxygen-free, dry nitrogen gas was fed to replace the inside of the flask therewith. After charging 300 ml of dry benzene, the flask was cooled in a water bath. Then 24.0 g of dichlorosilane were added into the flask. Subsequently, with stirring and cooling in the water bath, 23.8 g of ammonia which had been passed successively through a sodium hydroxide-containing tube and an active carbon-containing tube was, as a mixture with dry nitrogen gas, bubbled through the reaction mixture within the flask. During the course of the reaction, it was necessary to occsionally beat the gas passage downstream of the flask in order to remove a powdery substance which deposited on and accumulated in the inside surface thereof and to prevent the clogging thereof. After completion of the reaction, the reaction mixture was centrifuged and the supernatant was washed with dry pyridine. After filtration, the solvent was removed from the filtrate by evaporation in vacuo to leave 3.1 g of viscous oily polysilazane. Gel permeation chromatography of the polysilazane revealed that the polysilazane had a number-average molecular weight of 360. This polysilazane will be hereinafter referred to as polysilazane (III).

Polysilazane (III) thus obtained was dissolved in pyridine to give 100 ml of a pyridine solution containing 10.3 % by weight of polysilazane (III). The solution was charged in an autoclave with a 300 ml inside volume and reacted at 120° C. under autogeneous pressure for 8 hours with stirring in the atmosphere of nitrogen. A large amount of a gas was found to be produced.

After cooling to room temperature, dry ethylbenzene was mixed with the reaction mixture. The solvent was then removed by distillation at 50–70° C. under 3–5 mmHg to give 9.15 g of white powder soluble in toluene, tetrahydrofuran and chloroform. Gel permeation chromatography revealed that this powder (reformed polysilazane) had a number-average molecular weight of 1880.

EXAMPLE 7

The reformed polysilazane obtained in Example 2 was dissolved in dry toluene to give a toluene solution containing 82 % by weight of the reformed polysilazane. The solution was ejected from a nozzle into a high temperature atmosphere and the resultant spun fibers were successively wound around a roll. Coloress, transparent, continuous fibers of reformed, inorganic polysilazane were obtained.

EXAMPLE 8

The reformed polysilazane obtained in Example 1 was dissolved in orthoxylene, to which silicon carbide (average particle size: about 10 $\mu$) was mixed, thereby to obtain a dispersion containing 45 % by weight of reformed polysilazane, 30 % by weight of silicon carbide and 25 % by weight of orthoxylene. The dispersion was coated on a SS 41 stainless steel plate by spray coating. The coated substrate was then heated to 200° C. at a heat-up rate of 3° C./min in an oven under a nitrogen atmosphere for drying. The dried coat had a thickness of about 160 $\mu$m and a pencil hardness of 9H or more. The coat exhibited excellent adhesion to the substrate and was free of cracks.

EXAMPLE 9

The reformed polysilazane obtained in Example 1 was dissolved in orthoxylene, to which silicon carbide (average particle sizw: about 10 $\mu$) and hexamethyldisilazane (ajuvant) were mixed to obtain a dispersion containing 25 % by weight of the reformed polysilazane, 60 % by weight of silicon carbide, 0.5 % by weight of hexamethyldisilazane and 15 % by weight of orthoxylene. The dispersion was applied over the surface of a SUS 304 stainless steel plate by brush coating. The coat was dried and calcined at 800° C for 1 hour in the nitrogen atmosphere. The coated layer thus obtained had a pencil hardness of 9H or more and exhibited excellent adhesion to the substrate. No cracks were observed.

EXAMPLE 10

The reformed polysilazane obtained in Example 1 was dissolved in orthoxylene to obtain a solution having a concentration of the polysilazane of 90 % by weight. The solution was then applied to a SUS 304 stainless steel plate by immersion coating and the coat was calcined at 400° C. in air for 1 hour. The thus obtained coated layer had a pencil hardness of 4H and was free of cracks and excellent in adhesion to the substrate.

What is claimed is:

1. A reformed, inorganic polysilazane which is liquid or solid at room temperature and soluble in o-xylene at room temperature and which has (a) a number-average molecular weight of 1500–500,000, (b) contents of Si, N and H of 50–70% by weight, 20–34 % by weight and 5–9 % by weight, respectively; and (c) —SiH$_2$— and —SiH$_3$ groups, the molar ratio of the —SiH$_2$— groups to the —SiH$_3$ groups being 2.0:1 to 8.4:1.

2. A reformed, inorganic polysilazane in accordance with claim 1 produced by the method comprising:
   dissolving an inorganic polysilazane having a skeletal structure represented by the following recurring unit: —(—SiH$_2$—NH—)— in a liquid organic base which is unreactive with said inorganic polysilazane to form a solution;
   reacting said polysilazane in said solution at a temperature and for a period of time sufficient to polycondense the polysilazane by dehydrogenative polycondensation.

3. A reformed, inorganic polysilazane in accordance with claim 1 having a number average molecular weight of 1850–500,000.

4. A reformed, inorganic polysilazane in accordance with claim 1 characterized by the presence of the following branching:

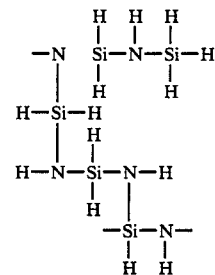

5. A reformed, inorganic polysilazane in accordance with claim 1 wherein the SiH$_2$/SiH$_3$ molar ratio is 2.0–7.0.

6. A reformed, inorganic polysilazane in accordance with claim 1 wherein the SiH$_2$/SiH$_3$ molar ratio is 2.0–5.0.

* * * * *

UNITED STATES PATENT AND TRADEMARK OFFICE
CERTIFICATE OF CORRECTION

PATENT NO. : 4,933,160
DATED : June 12, 1990
INVENTOR(S) : FUNAYAMA et al

It is certified that error appears in the above-identified patent and that said Letters Patent is hereby corrected as shown below:

Col. 4, line 22, "polYsilazane" should read --polysilazane--.

IN THE CLAIMS:

Col. 10, the formula reads:

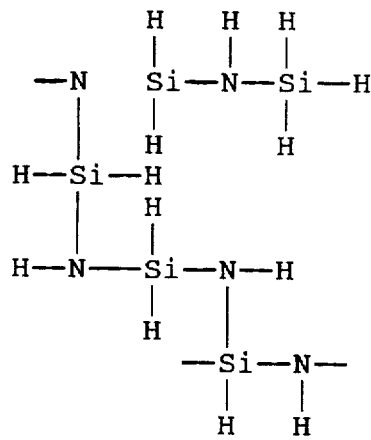

UNITED STATES PATENT AND TRADEMARK OFFICE
CERTIFICATE OF CORRECTION

PATENT NO. : 4,933,160
DATED : June 12, 1990
INVENTOR(S) : FUNAYAMA et al

It is certified that error appears in the above-identified patent and that said Letters Patent is hereby corrected as shown below:

and should read:

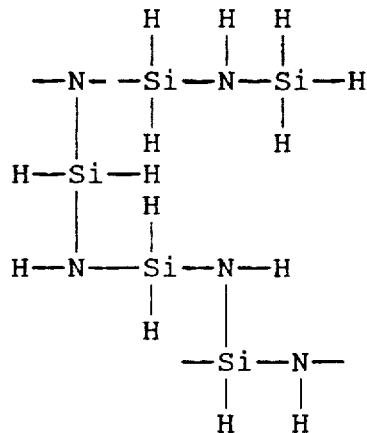

Signed and Sealed this

Eighteenth Day of February, 1992

Attest:

HARRY F. MANBECK, JR.

*Attesting Officer*     *Commissioner of Patents and Trademarks*